United States Patent Office 3,783,091
Patented Jan. 1, 1974

---

3,783,091
POLYSULPHONE REINFORCED SILICON ELASTOMER SEAL
Victor Jeffrey Leslie, Potters Bar, and Maurice Bernard Leggett, Claverdon, England, assignors to Imperial Chemical Industries Limited, London, England
No Drawing. Filed May 8, 1972, Ser. No. 251,465
Claims priority, application Great Britain, May 14, 1971, 14,874/71
Int. Cl. B32b 9/04
U.S. Cl. 161—168
3 Claims

ABSTRACT OF THE DISCLOSURE

A reinforced seal is provided in which a silicone elastomer as hereinafter defined is formed on a rigid reinforcement containing at least one aromatic polysulphone.

---

This invention relates to seals and in particular to reinforced seals.

Seals are generally formed from resilient elastomeric material. However, such material may have poor dimensional stability which is undesirable particularly if the seal is to be used in mechanical applications. Included among materials which are known and have been widely used for seals are silicone elastomers. In use these have normally been reinforced by metal inserts around which an elastomer-forming composition is cured to an elastomer and to form the desired shaped seal.

According to the present invention a reinforced seal is provided in which a silicone elastomer is formed on a rigid reinforcement containing at least one aromatic polysulphone.

Aromatic polysulphones and methods for making them are described in British specifications 1,016,245; 1,060,546; 1,078,234; 1,109,842; 1,122,192; 1,133,561; 1,153,035; 1,153,528; 1,177,183; 1,234,301 and 1,246,035, Canadian patent specification 847,963 and Belgian patent specification 741,965, U.S. Pat. No. 3,432,468 and German specification 1,938,806, the disclosure of each of which is incorporated herein by reference.

The aromatic polysulphones described in the above-mentioned specifications comprise repeating units of the formula

—AR—SO₂— in which Ar is a bivalent aromatic radical and may vary from unit to unit in the polymer chain (so as to form copolymers of various kinds). Thermoplastic polysulphones generally have at least some units of the structure

in which Z is oxygen or sulphur or the residue of an aromatic diol such as 4,4'-bisphenol. One example of such a polysulphone has repeating units of the formula

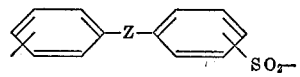

another has repeating units of the formula

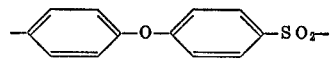

and others (which are commercially available in the United States of America) are said to have repeating units of the formula

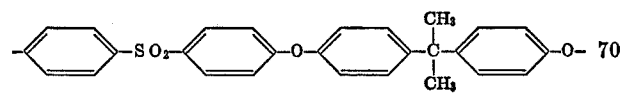

(Union Carbide Corporation) or copolymerised units in in various proportions of the formulae

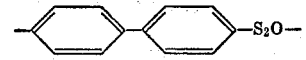

and

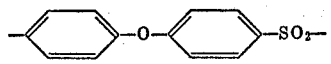

(Minnesota Mining and Manufacturing Company). Another polysulphone has repeating units of the formula

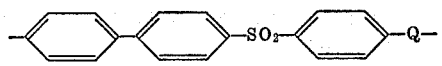

where Q is oxygen or sulphur.

The aromatic polysulphones are generally thermoplastic materials having high melting point, non-inflammability, excellent heat stability and dimensional stability so that reinforcements according to the invention may be obtained by any process known for the manufacture of such articles for example extrusion, compression- and injection-moulding. The inertness of most aromatic polysulphones to a wide range of chemicals including acids, alkalis and oils (such as vegetable and mineral oil) and their good creep performance at high temperatures even approaching their softening point makes them eminently suitable as reinforcing materials for seals of the present invention. The aromatic polysulphones may contain fillers such as for example glass, asbestos and carbon fibres. The performance of the reinforcement at high temperatures may be improved if the aromatic polysulphone is cross-linked during or after fabrication. The aromatic polysulphones described above where Z is oxygen or sulphur may be cross-linked by, for example, irradiation by ionizing radiation. If the aromatic polysulphone has been premixed with elemental sulphur or a sulphur compound, then cross-linking can occur on heating or irradiation.

A wide variety of silicone elastomer-forming compositions may be used in the seals of the invention. Such elastomer-forming compositions are well known and are based on linear organopolysiloxane, which may vary in consistency from viscous liquids to stiff high molecular weight gums, capable of being cured to an elastomer together with one or more fillers, a curing agent and, if desired, other additives. The compositions are normally heat cured. Fillers used in such compositions include various forms of silicas such as fume silicas, silica aerogels and precipitated silicas, diatomaceous earths, metal oxides and the like.

In some cases it may be considered desirable to coat the polysulphone with a priming composition before applying the silicone elastomer-forming composition thereto. Suitable priming compositions are well known, and are normally based on vinyl silanes.

Reinforced seals of the present invention are particularly useful as mechanical seals in for example engines as crankshaft seals, drive seals, gearbox seals, in chemical plant as stirrer shaft seals, valve seals and the like.

The invention is illustrated by the following example.

Aromatic polysulphone containing repeat units having the formula

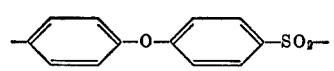

made by the method similar to that of Example 3 of British specification 1,153,035 and a reduced viscosity of 0.4 (as measured at 25° C. on a solution of the polymer in dimethyl formamide containing 1 g. of polymer in 100 cm.³ of solution) was compression-moulded at about 300° C. to the required shape for the reinforcement. The reinforcement was placed in a mould and a silicone elastomer-forming composition moulded around the reinforcement. The silicone rubber was cured under pressure for 10 minutes at 160° C. and post-cured in an oven provided with air circulation at 150° C. for 6 hours.

The silicone elastomer-forming composition used consisted of a base stock consisting of 80 parts by weight of a polymethylvinylsiloxane gum containing 0.2 mole percent vinyl groups and 20 parts by weight of a fume silica to which were added 10 parts by weight of "Aerosil" 200, 30 parts by weight of "Celite Superfloss" and 1.0 part by weight of "Dicup" 40C.

We claim:

1. A reinforced seal in which a silicone elastomer is formed on a rigid reinforcement containing at least one aromatic polysulphone.

2. A reinforced seal according to claim 1 in which the aromatic polysulphone has repeating units of the formula

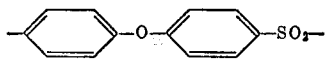

3. A reinforced seal according to claim 1 in which the silicone elastomer is formed from polymethylvinylsiloxane.

References Cited
UNITED STATES PATENTS
3,549,595  12/1970  Campbell _____ 161—213

GEORGE F. LESMES, Primary Examiner

M. S. McCAMISH, Assistant Examiner

U.S. Cl. X.R.

161—182, 206; 260—37 SB, 46.5 VA, 47 VA, 49, 79.3 M, 824 R

UNITED STATES PATENT OFFICE
CERTIFICATE OF CORRECTION

Patent No. 3,783,091                    Dated January 1, 1974

Inventor(s) Victor Jeffrey Leslie et al

It is certified that error appears in the above-identified patent and that said Letters Patent are hereby corrected as shown below:

IN THE SPECIFICATION:

Column 1, line 45, "AR" should read --Ar--.

Column 2, line 5, "$S_2O$" should read --$SO_2$--.

Signed and sealed this 13th day of August 1974.

(SEAL)
Attest:

McCOY M. GIBSON, JR.                      C. MARSHALL DANN
Attesting Officer                         Commissioner of Patents